UNITED STATES PATENT OFFICE.

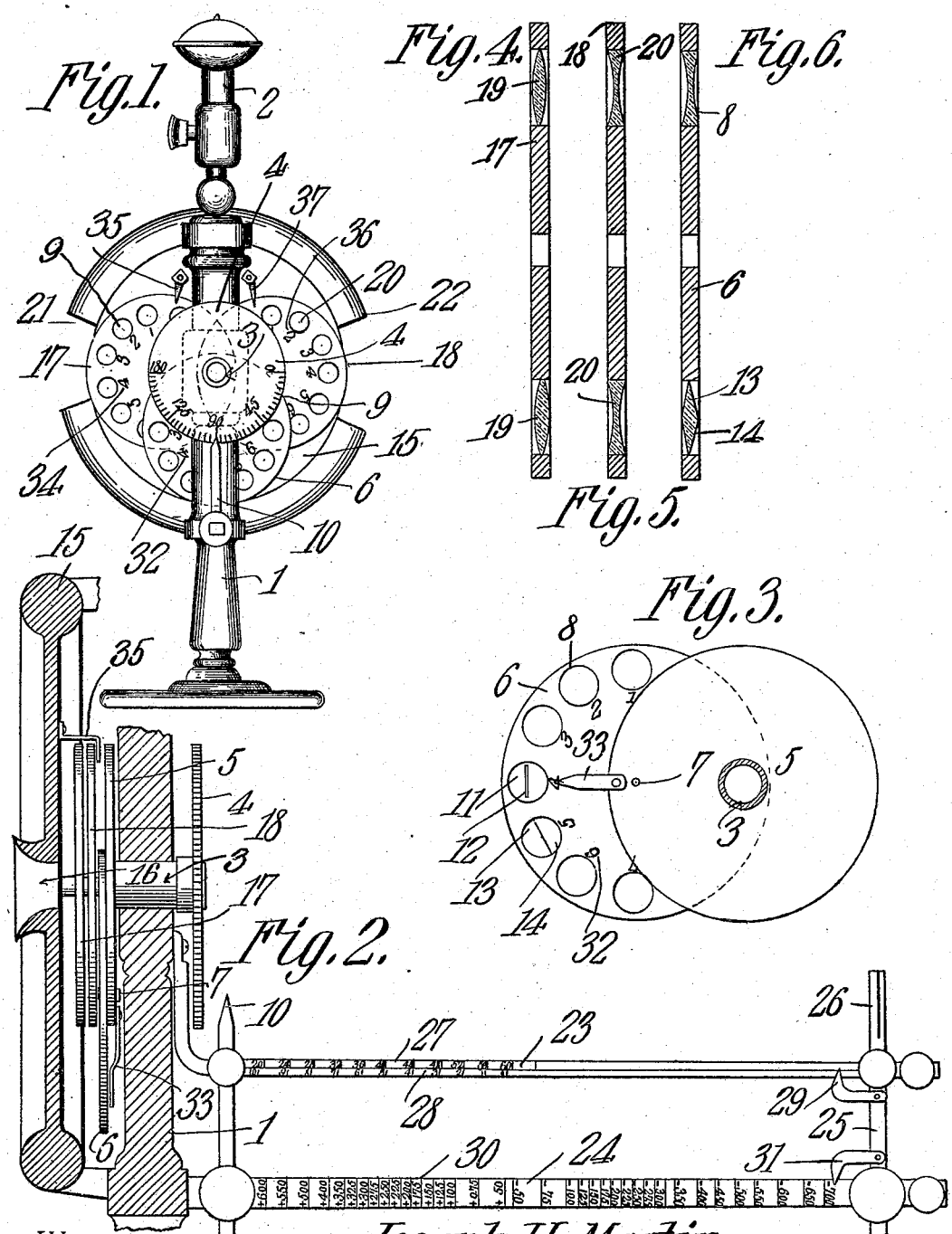

JOSEPH HARRY MARTIN, OF ROANOKE, VIRGINIA.

OPTOMETER.

941,581.  Specification of Letters Patent.  Patented Nov. 30, 1909.

Application filed July 18, 1907. Serial No. 384,407.

*To all whom it may concern:*

Be it known that I, JOSEPH HARRY MARTIN, a citizen of the United States, residing at Roanoke, in the county of Roanoke and State of Virginia, have invented a new and useful Optometer, of which the following is a specification.

My present invention relates to improvements in instruments of the kind used by oculists and opticians for testing the refractive qualities of the human eye with a view of determining what errors, if any, exist, and the amount of correction necessary in each case in order that eyeglasses may be fitted, and it has for its object to provide a combined testing and correcting instrument of this character that is not only capable of readily and accurately determining whether the eye is normal or whether it is myopic or hypermetropic, either throughout the entire field or on a meridian or axis, as in the case of astigmatism, but it embodies a novel arrangement of lens sets that are capable of being readily set up in combinations to correct the refractive errors of the eye in each particular case, indicators being employed for directly designating the powers of the spherical and cylindrical lenses employed in the correction, and also designating the axes of the latter.

Another object of the invention is to provide an instrument of this character wherein plus or minus lenses of different powers may be adjusted into the field of vision of the patient's eye, either separately or in different combinations one with the other, the different lenses being placed before the patient's eye or changed, as may be desired, without the necessity of uncovering the eye, accuracy in results being insured and the convenient arrangement of the lenses in sets of different powers enabling the adjustments to be effected with the greatest facility.

A further object of the invention is to provide an improved mode of mounting a set of cylinder lenses, whereby the different lenses may be readily brought into position and revolved until the axis of the lens coincides with the axis of myopic or hypermetropic portion of the eye under test, the cylinder lenses being capable of the different adjustments either separately or in combination with the plus and minus spherical lenses without disturbing any combinations that may be set up with the latter, indicators being also supplied which designate the power and the axis of the cylinder lens when the errors have been corrected, it being thereby necessary to read the scales to obtain a prescription.

It is also an object of my invention to provide an improved sighting device in combination with the lens set described, whereby the patient's eye may be readily prepared for testing, and a reading may be had that will indicate approximately the lenses necessary for correcting the errors that exist.

To these and other ends, the invention comprises the various novel features of construction and combination and arrangement of parts, which will be hereinafter more fully described, and pointed out particularly in the appended claims.

In the accompanying drawings:—Figure 1 is an elevation of an optical instrument constructed in accordance with the present invention, the instrument being viewed from that side at which the operator is stationed. Fig. 2 represents a detail view of the sighting device and its coöperating scales, the lens carriers being shown in side elevation. Fig. 3 is a detail view of the carrier for the cylinder lenses and other devices for determining the axis or meridian of the myopia or hypermetropia. Fig. 4 represents a section of the carrier for the plus lenses. Fig. 5 is a similar view of the carrier for the minus lenses. Fig. 6 is a sectional view of the carrier for the cylinder lenses and related devices.

Corresponding parts in the several figures are indicated throughout by similar characters of reference.

The instrument shown in the present embodiment of the invention embodies a stand 1 of any suitable construction adapted to rest upon a table or other suitable support, it being provided, in the present instance, with a lamp or illuminating device 2 whereby the object observed by the patient during the test may have a fixed illumination.

A sight tube 3 is journaled in the stand on preferably a horizontal axis, that end of the tube toward which the operator is stationed being provided with an adjusting wheel or disk 4, and the opposite end of the tube being provided with a disk 5 on which the carrier for the cylinder lenses is mounted. The carrier employed in the present instance is composed of a disk 6 pivotally attached to the disk 5 by means of a pivot 7 and it is arranged to revolve about this pivot as well as about the axis of the sight tube when the latter is rotated. The carrier 6 is provided with a suitable number of apertures which are arranged in a row concentric with the pivot 7 and are adapted to register successively with the axis of the sight tube. Into these apertures are fitted a set of cylinder lenses 8 which are preferably graded progressively according to their refractive powers, and the axes of all the cylinder lenses of the set are preferably arranged at right angles to the radii of the disk 6 which pass through the centers of the respective apertures into which the lenses are fitted, any suitable mounting being employed for immovably securing the lenses. These cylinder lenses are adapted to register with the sight tube, and obviously by rotating the latter the axis of each cylinder lens may be shifted into different angular relations to the horizontal, and, in order to indicate the different angular positions of these lenses, the adjusting disk 4 is provided with a protractor scale 9 which coöperates with a pointer 10 secured to a relatively fixed part of the stand.

In order to assist the operator to determine the axis or meridian on which the error of refraction occurs, it is preferable to provide a diaphragm 11 in one of the apertures of the disk 6, the diaphragm being opaque and provided with a very minute slit 12, the slit being ordinarily about one inch long and one millimeter wide, and extending in a direction corresponding to the axes of the cylinder lenses, and this slit may be adjusted into different positions about the axis of the sighting tube by rotating the disk 5, the purposes and mode of using the so-called stenopaic slit being well known in the optical art.

In some cases, very accurate results may be obtained by casting two images on the retina of the eye, the relative displacement of the images indicating whether there is an excess or deficiency in the refractive power of the eye. This test may be applied, in the present instance, by the aid of a pair of reversely arranged prisms 13 and 14 which are preferably mounted in one of the apertures of the cylinder lens carrier, these prisms, in the present instance, being arranged base to base, and the axes of the prisms preferably extending in a given direction relatively to the axes of the cylinder lenses. As these prisms are mounted on the cylinder lens carrier, their axes may be shifted into different angular positions relatively to the horizontal by rotation of the adjusting disk on the sight tube, the protractor scale and its coöperating indicator indicating the degree of inclination of the axes of these prisms.

Secured to the stand is a septum 15 having an eye piece 16 through which the patient observes the test type or other object employed in the test, and on that side of the septum adjacent to the standard are mounted a pair of lens carriers 17 and 18 for the plus and minus spherical lenses, the carrier 17 being pivoted on one side of the standard and having a concentric row of apertures therein in which are mounted a set of plus spherical lenses which are preferably arranged progressively according to their powers and are adapted to register successively with the sight tube. The carrier 18 is mounted on the opposite side of the stand and provided with a circular row of apertures in which are mounted a set of minus spherical lenses 20, these lenses being preferably arranged progressively according to their refractive powers and being adapted to register successively with the sight tube. Those portions of the three lens carriers which extend past the sight tube are arranged to overlap one another, the carriers being preferably composed of relatively thin disks fitted to operate very close to one another in order that the lenses of the three carriers may be set up in combinations with only slight spaces between them. In order to facilitate adjustment of the spherical lens carriers, it is preferable to cut away the opposite edges of the septum, as at 21 and 22, in order to expose the peripheries of these carriers and thus facilitate their adjustment. Extending from the opposite side of the standard from that on which the septum is arranged are a pair of arms 23 and 24, the arms being preferably parallel and extending in a horizontal direction and parallel to the axis of the sight tube, and on these arms is mounted a slide 25 having a post or bracket 26 adapted to serve as a support for the test type or reading matter usually employed during the eye test, and these arms are preferably of a length sufficient to permit the slide to be adjusted to the various reading distances of different patients. One of the arms, the arm 23 in the present instance, is provided with a scale 27 calibrated to designate the age of the patient, and the same arm is also provided with a scale 28 to designate the accommodation of the eye, a pointer 29 carried by the slide coöperating with both of these scales. The other arm, 24, is provided with a scale 30 which is calibrated to indicate directly the refractive powers required to correct the errors of refraction of the eye, a pointer 31 on the slide being arranged to coöperate with the lens scale.

In order to enable the operator to instantly determine the power of the lens or lenses before the patient's eye, it is preferable to provide the different lens carriers with suitable scales and pointers to coöperate therewith, the cylinder lens carrier being provided with a scale 32 marked according to the power of the lenses in the carrier, and this scale coöperates with a pointer 33 secured to the periphery of the disk 5 which revolves about the sight tube. The carrier 17 is provided with a similar scale 34 which coöperates with a pointer 35 secured to a relatively fixed portion of the stand, such as to the septum, and the carrier 18 is provided with a scale 36 which coöperates with a pointer 37 which is also mounted on a relatively fixed portion of the stand.

In practice, the patient is stationed at the left hand side of the instrument, as shown in Fig. 2, one eye at a time being applied to the eye piece, and the lens carriers are adjusted so that a vacant aperture in each disk registers with the sight tube, and this enables the patient to obtain an unaided observation of the test type or other object arranged upon the slide. The oculist or optician may then adjust the slide longitudinally of the scale arms until the object appears the clearest to the patient. By reading the scale 30, the operator may readily determine approximately the power and class of spherical lens that is to be used, a plus lens of the appropriate power being adjusted into the line of vision by revolving the carrier 17, while a minus lens of the desired power is brought into the line of vision by appropriate turning of the scale 19, the pointers 35 and 37 coöperating with the respective scales to enable the operator to correctly center the desired lens in alinement with the axis of the sight tube. In many cases a lens to effect the required correction may be found upon either one of these carriers, but by simultaneously using the lenses of the two carriers, a very large number of combinations is possible, the different plus and minus lenses being set up simultaneously, and the resultant refractive power being equal to the difference between the refractive powers of the two lenses employed In testing eyes that are astigmatic, the meridian or axis of the astigmatism may be readily ascertained by the use of the stenopaic slit 12 which is brought into the line of vision by revolving the cylinder lens carrier, and it is rotated into different angular positions relatively to the horizontal by rotating the adjusting disk 3, and when the meridian has been located, its angle may be directly determined by reading the protractor scale 9. Myopia or hypermetropia may be ascertained by the use of the double prism which is also preferably mounted in the cylinder lens carrier, these prisms being brought into the line of vision by rotation of the carrier and the relative displacement of the images which are cast upon the retina of the eye will indicate whether the error of refraction is myopic or hypermetropic, the axes of the prisms being shifted into different angular positions relatively to the horizontal by manipulation of the adjusting disk.

After the meridian has been located and it has been determined whether the astigmatic error is myopic or hypermetropic, the different cylinder lenses (minus or plus as the case may require) may be brought into the line of vision successively until a lens of the proper refractive power is obtained, that is sufficient to correct the astigmatic error, the disk 3 having been previously set so that the axes of the several lenses will extend in the direction of the meridian of astigmatism of the eye.

By reading the scales of the lens carrier, a prescription is obtained that will enable the patient to obtain the proper lenses to correct the errors of sight.

An optical instrument constructed in accordance with the present invention is not only capable of readily determining the errors of refraction of the eye, but it also embodies means for correcting the errors, the correcting lenses being so mounted that they may be manipulated with the greatest facility, and they are adapted for use in combinations that enable a large number of refractive powers to be obtained with a small number of lenses. Moreover, by arranging the double prism on the cylinder lens carrier, it is not only capable of use in those cases where spherical lenses alone would be sufficient to correct the errors, but it is also capable of determining whether astigmatic errors are myopic or hypermetropic, so that the testing of the eyes may be accomplished quickly and accurately and with a minimum discomfort to the patient. Furthermore, the fogging effect to cause a relaxation of the muscles of the eye may be accomplished in either of two ways, that is to say, by adjusting the slide carrying the test type until the latter is out of focus with the patient's eyes, or a similar result may be obtained by using a plus lens, the fogging being reduced by the minus lenses until the proper definition is secured, the difference in the refractive powers of the two lenses corresponding to the power of the lens to be prescribed.

What is claimed is:—

1. An optometer comprising a suitable stand, a sight tube journaled in the stand, a graduated adjusting disk at one end of the tube, a disk eccentrically mounted on the other end of said sight tube and carrying optical testing means, said last named disk being rotatable to carry the optical testing means into alinement with the sight tube and also having orbital movement about the axis of rotation of the tube, a fixed septum carried by the stand and provided with an eye piece in line with the sight tube, and lens carrying disks on the septum on each side of the eye piece and each rotatable about an axis carried by the septum to bring the lenses into the optical axis of the sight tube, and indices carried by the septum in operative relation to the lens carrying disk thereon.

2. An optometer comprising a suitable stand, optical testing means carried thereby, parallel arms carried by the stem and projecting from one side thereof, said arms having scale indications thereon, a slide on the arms having a support for testing means, and pointers on the slide, one pointer being arranged for one arm and the other pointer for the other arm.

In testimony that I claim the foregoing as my own, I have hereto affixed my signature in the presence of two witnesses.

JOSEPH HARRY MARTIN.

Witnesses:
J. H. DICKINSON,
C. E. SOWDER.